United States Patent [19]

Rysti

[11] 4,232,778
[45] Nov. 11, 1980

[54] TIMBER-CONVEYING METHOD AND APPARATUS

[76] Inventor: Alpo Rysti, Frisansintie 22, 02240 Espoo 24, Finland

[21] Appl. No.: 890,941

[22] Filed: Mar. 28, 1978

[30] Foreign Application Priority Data

Nov. 18, 1977 [FI] Finland .................................. 773504

[51] Int. Cl.$^2$ ............................................. B65G 47/12
[52] U.S. Cl. ..................................................... 198/443
[58] Field of Search ............... 198/443, 444, 550, 557, 198/559, 616, 838, 840; 214/1 P, 8.5 R; 221/192, 253

[56] References Cited

U.S. PATENT DOCUMENTS

| | | | |
|---|---|---|---|
| 3,708,059 | 1/1973 | Ackermann | 198/840 |
| 3,777,932 | 12/1973 | Matsui et al. | 221/253 |

FOREIGN PATENT DOCUMENTS

| | | | |
|---|---|---|---|
| 1627229 | 8/1971 | Fed. Rep. of Germany | 198/550 |
| 783200 | 9/1957 | United Kingdom | 198/838 |
| 237698 | 6/1969 | U.S.S.R. | 198/443 |

*Primary Examiner*—Jeffrey V. Nase
*Attorney, Agent, or Firm*—Steinberg & Raskin

[57] ABSTRACT

A timber-conveying method and apparatus according to which a batch of timber is delivered by any suitable delivery structure onto a conveyer. This conveyor provides for the batch of timber delivered thereto an initial path of movement which has with respect to a horizontal plane an inclination, if any, which is small enough to provide for conveying not only of those timber pieces which directly engage the conveyer but also of timber pieces which are on top of the pieces engaging the conveyer. The conveyer provides for the timber a path of movement subsequent to the initial path of movement and inclined upwardly with respect to a horizontal plane at an angle which is substantially greater than the inclination, if any, of the initial path of movement. This inclination of the subsequent path of movement is such that while those timber pieces which directly engage the conveyer will be conveyed thereby along this subsequent path of movement, those timber pieces which are on top of the pieces directly engaging the conveyer will be caused to travel back toward the initial path of movement, so that by the time timber pieces have been conveyed to the end of the subsequent path of movement, the conveyer will convey only timber pieces, one after the other, which directly engage the conveyer.

6 Claims, 12 Drawing Figures

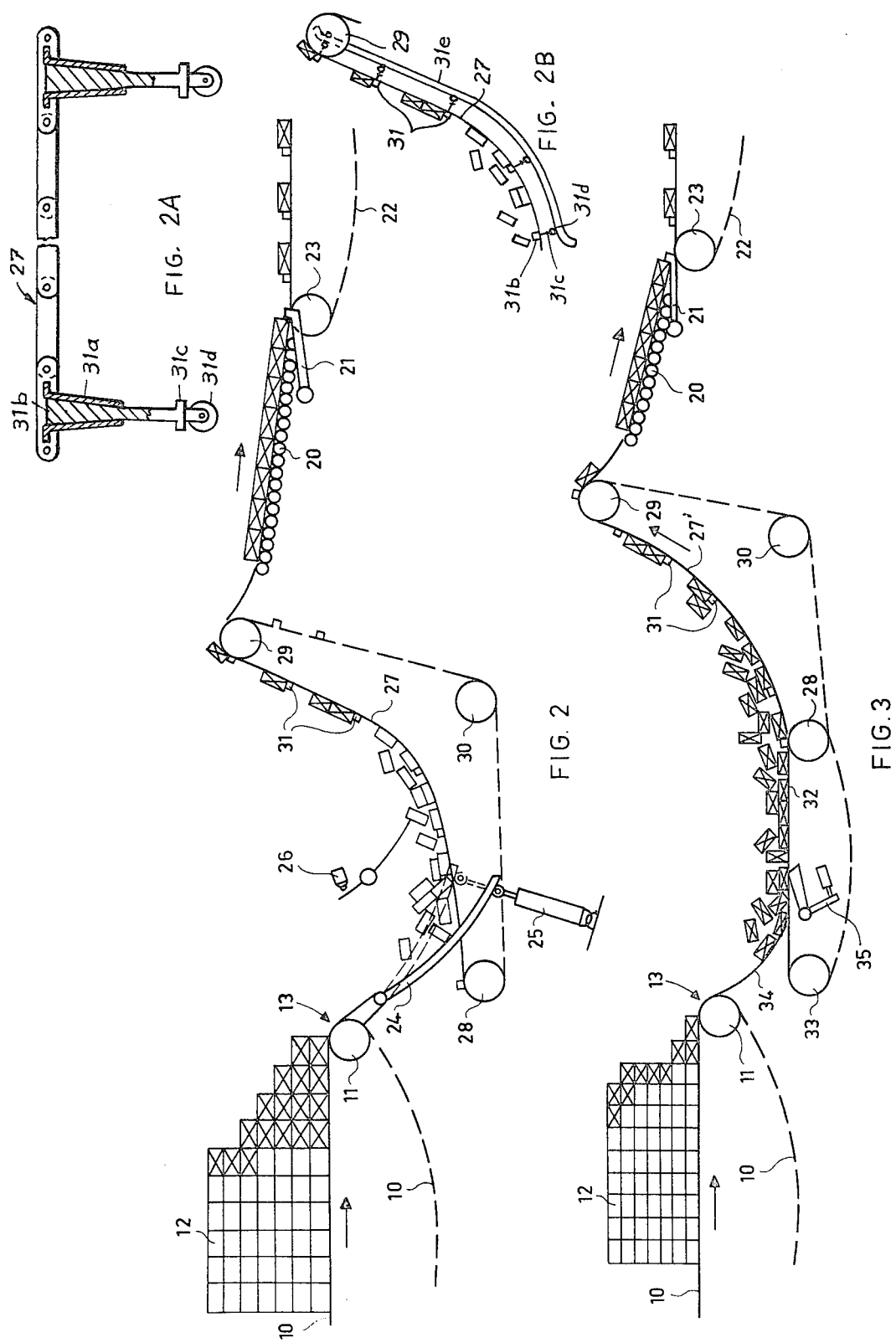

TIMBER-CONVEYING METHOD AND APPARATUS

BACKGROUND OF THE INVENTION

The present invention relates to methods and apparatus for conveying timber.

In particular, the present invention relates to a method and apparatus for conveying a batch of timber pieces in such a way that the batch is dispersed into individual timber pieces As is well known, in modern, high-capacity processing plants for handling timber which is sawed or planed, it is necessary to disperse batches or heaped packages of timber, or timber packages with spaces between layers of timber, in such a way that the timber pieces derived from the batch are conveyed individually one after the other while at the same time avoiding any damage to the timber pieces during dispersing thereof from a batch into individual timber lengths which are conveyed one after the other.

With presently known methods and apparatus of the above general type, in order to disperse timber packages or batches into individual lengths of timber which are conveyed one after the other, the timber batch or package is fed forwardly, usually by a conveyer, up to a discharge point where the batch or package of timber is dropped into a scattering shaft having upright walls one of which takes the form of a vertical log lift provided with projections for engaging the timber pieces and raising them individually up from the batch which has dropped into the scattering shaft. The angle of ascent of such a lift is so great that timber will not rise upwardly from the scattering shaft without engaging projections or grippers which form part of the lift. The extent to which the projections for engaging the timber extend from the conveyer is adjustable so that the timber pieces will be advanced upwardly from the batch in only a single layer or in other words with the timber pieces being conveyed upwardly in such a way that they must be situated only one after the other.

With constructions of this latter type, it is essential to lift timber pieces from the batch of timber initially from the lowest part of the batch, so that the lowermost timber pieces are initially under a load imposed by the timber pieces which are on top of the lowermost timber pieces. It is thus natural and obvious that the timber pieces will be damaged as they are pushed upwardly through higher timber pieces which are in the path of movement of the lifted timber pieces as they rise up out of the heap. It is furthermore a fact that the timber pieces frequently must be rotated so that they can be properly engaged by the grippers or projections of the lift. Particularly in this last connection the edges of the timber pieces are damaged and breaking of the timber pieces frequently occurs. However, such handling of the timber pieces is conventionally carried out only because the latter type of procedure are relatively fast, and the economical losses incurred by damage to the timber pieces are considered an inevitable evil.

SUMMARY OF THE INVENTION

It is accordingly a primary object of the present invention to provide a method and apparatus capable of avoiding the above drawbacks.

In particular it is an object of the present invention to provide a method and apparatus according to which it becomes possible to disperse timber packages or batches, particularly edged timber, at a comparatively high rate of speed while at the same time avoiding damage to the edges of the timber.

With the method and apparatus of the invention the timber package or batch is initially conducted along a substantially horizontal path of an ascending conveyer, with practically the entire timber batch or package initially being transported and then lifted by way of a smoothly upwardly curving portion of the conveyer so that gravity acts on timber pieces above those which directly engage the conveyer to overcome the friction between these timber pieces and those which directly engage the conveyer so as to cause the timber pieces above those which directly engage the conveyer to travel back down from the timber pieces which are directly in engagement with the conveyer, mainly by sliding downwardly and backwardly from the upward path along which the conveyer transports those timber pieces which directly engage the conveyer. In this way the conveyer will provide at its delivery end only a timber layer of predetermined thickness.

Thus, the conveyer of the invention has projections or timber grippers which engage behind timber pieces which directly engage the conveyer to cause them to travel upwardly with the conveyer at the ascending run thereof, the conveyer having before the upward ascending run thereof a substantially horizontal run for receiving the timber package or batch. The construction of the conveyer is such that it will provide for a smooth downward sliding of those timber pieces which do not directly engage the conveyer and which move upwardly with the same, the conveyer being curved smoothly in an upward direction for dispersing the timber package or batch substantially from the top downwardly and backwardly in such a way that the timber will arrive at the delivery location of the conveyer in the shape of a layer of desired thickness.

Providing a conveyer with an initial path of movement which has with respect to a horizontal plane an inclination, if any, which is so small that the entire batch of timber will be conveyed along this initial path of movement and then directing the conveyer upwardly along a subsequent path of movement which is inclined with respect to a horizontal plane to an extent much greater than the inclination of the initial path of movement presents certain difficulties because a flexible conveyer composed of conveyer chains or the like tends to take a shortcut and to rise upwardly along a straight path.

These are known methods and structures for guiding conveyers such as conveyer chains. Thus it is known to arrange conveyer chains so as to travel in a groove formed by a beam while providing at the conveyer chain suitable rollers or slide or drag pieces which slide along the walls of such a guiding groove. A construction of this type has the drawback that particularly when sawed timber pieces are transported and carry sawdust, these grooves become blocked with the sawdust and causes jamming of the chains. In addition providing chains with supporting rollers or the equivalent thereof results in an extremely expensive construction.

In addition, it is known to provide an arrangement and method according to which the drive for the conveyer chain is situated at the lower end of the conveyer, thus resulting in pushing of the chain in advance of the lower drive thereof. Such an arrangement can indeed be utilized in the event that a uniform load is encountered, but in the event that different parts of the chain system are differently loaded, the chains unavoidably rise out of their guiding grooves.

It is also known in the prior art to provide guiding by connecting both ends of an ascending conveyer directly to a drive so that both ends rotate in synchronism with each other. Such a construction does indeed permit a degree of load variation at different parts of the chain system, but the extent of load variation which is possible is not very great and in addition such a construction is extremely expensive.

Also, there are known constructions where a conveyer chain is provided on one side with a guide situated only where the conveyer assumes a concave configuration. In this case, however, the guiding structure has an open groove, which is open at one side, and which is clearly susceptible to clogging so as to present drawbacks of the type referred to above.

It is accordingly a further object of the present invention to provide a method and apparatus according to which it is possible to guide a timber-lifting conveyer while eliminating the drawbacks encountered with known conveyer guides.

In order to achieve this latter object the guiding of the belts or chains of an ascending conveyer of the invention is carried out by distributing projecting elements, in the form of angle members, at intervals along each conveyer belt or chain, these angle members having laterally extending walls which run behind an elongated guide rail, with a construction being such that if there are grooves at the conveyer belts or chains, such grooves are open at the bottom thereof so that they will not become clogged.

According to the invention a batch of timber is delivered by a suitable delivering means to a predetermined location where the thus-delivered batch of timber is received by a conveyer means which serves to convey the thus-received batch of timber initially along an initial path of movement which has with respect to a horizontal plane an inclination, if any, which is small enough to provide for transporting at the initial path of movement not only those timber pieces which directly engage the conveyer means but also timber pieces which are on top of those which directly engage the conveyer means. This conveyer means then provides for the transported timber a subsequent path of movement which is inclined upwardly with respect to a horizontal plane at an angle substantially greater than the inclination, if any, of the initial path of movement, this inclination of the subsequent path of movement being such that those timber pieces which otherwise would remain on top of the timber pieces directly engaging the conveyer means are caused to travel by gravity backwardly toward the initial path of movement, so that by the time the conveyer means has conveyed timber pieces to the end of the subsequent path of movement, the conveyer means will convey only timber pieces, one after the other, which directly engage the conveyer means.

BRIEF DESCRIPTION OF DRAWINGS

The invention is illustrated by way of example in the accompanying drawings which form part of this application and in which:

FIG. 2 is a schematic side elevation of one embodiment of a method and apparatus according to the invention;

FIG. 2A is a schematic partly sectional side elevation showing a possible variation of a part of the structure of FIG. 2;

FIG. 2B is a schematic side elevation illustrating how controls cooperate with movable projections of the embodiment of FIG. 2A;

FIG. 3 is a schematic side elevation of a further embodiment of a method and apparatus according to the invention;

DESCRIPTION OF PREFERRED EMBODIMENT

Figure 1:
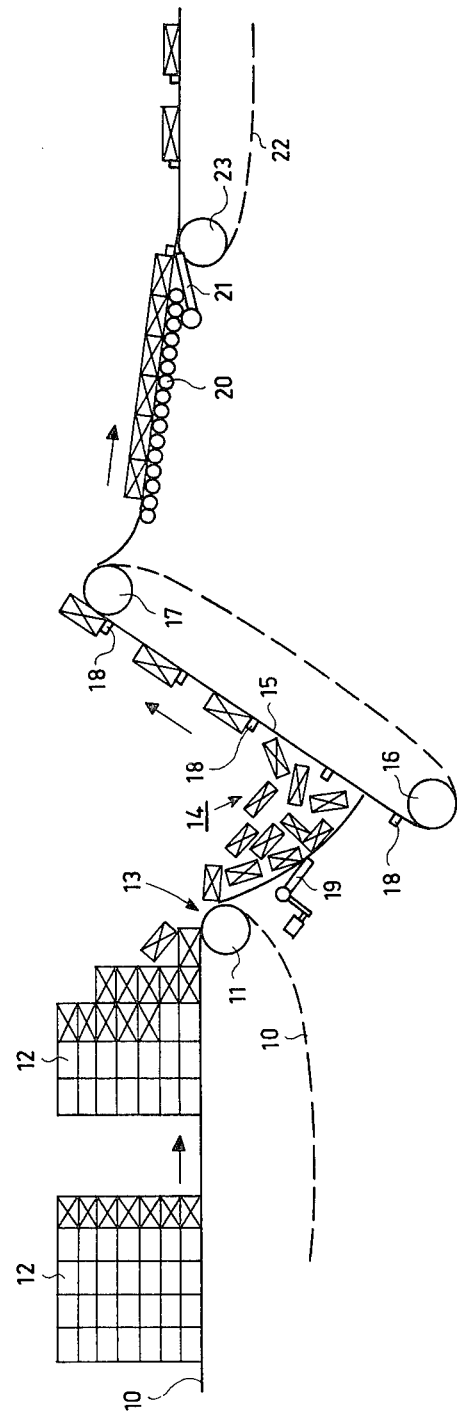
FIG. 1 is a schematic side elevation illustrating a known method and apparatus for dispersing a timber package into individual lengths of timber which are conveyed one after the other.

Referring first to FIG. 1 which shows the state of the art improved by the present invention, there is illustrated therein a method and apparatus commonly used for dispersing timber packages or batches. Thus FIG. 1 shows timber packages or batches 12 being delivered by a conveyor 10 which is only fragmentarily and schematically indicated. The conveyor 10 delivers the batches 12 one after the other to the discharge end 13 of the conveyor 10, the belt or chains of this conveyor being guided around pulleys or sprockets 11 as schematically illustrated. After traveling past the discharge end 13 of the conveyor 10, each batch 12 drops into a scattering shaft 14 one wall of which is formed by the timber lift 15 which has projections 18 for engaging behind lengths of timber as illustrated. Thus the lift 15 itself is in the form of a substantially upright conveyor having endless chains or belts which are guided around upper sprockets or pulleys 17 and lower sprockets or pulleys 16. Of course, suitable drives are connected, for example, to the rotary member 11 and the rotary member 17 for driving the conveyors 10 and 15. The angle of ascent of the conveyer 15 is sufficiently steep to preclude the conveyor 15 from lifting out of the scattering shaft 14 any timber pieces except those which are engaged by the projections 18. The extent to which the projections 18 project beyond the surface of the conveyor 15 which engages the timber pieces is usually adjusted so that the timber pieces are conveyed by the conveyor 15 in the form of a single layer in which the timber pieces are spaced from each other in accordance with the spacing of the grippers or projections 18. In this way a preselected number of timber pieces, such as one in the illustrated example, is situated in advance of each projection 18. The timber is metered while being fed into the scattering shaft 14 in that batches of a predetermined magnitude are dropped at a predetermined rate one after the other into the shaft 14, and as each batch falls into the shaft 14 it actuates a limit switch 19 which stops the travel of the feed conveyor 10 immediately subsequent to the dropping of a batch into the scattering shaft 14. Quite often, however, the cut-off pulse is also supplied by way of an optic gate system. Thus only after a batch of timber has moved beyond the limit switch 19 does the latter operate automatically to start the conveyor 10 so that the next batch will be delivered. Thus when the limit switch 19 is released as the scattering shaft 14 is empty, the feed conveyor 10 again starts. Subsequent to the lift 15 the timber pieces are delivered, for example, onto a roller track 20 which is inclined so that the timber pieces roll downwardly toward the right as shown by the arrow in FIG. 1, and this roller type of conveyor 20 is followed by a metering means 21 which serves to control the delivery of the timber pieces one after the other with a suitable spacing onto a conveyor 22 which is fragmentarily and schematically indicated, guided by rotary members 23. This conveyor 22 transports the timber pieces to subsequent treating apparatus.

The primary drawback, among others, of the method and apparatus shown in FIG. 1 resides in the fact that it is necessary for the lift 15 to dislocate timber pieces from the batch dropped into the scattering shaft 14 primarily from the lowest part of the batch, so that each timber piece is easily damaged as it is displaced upwardly from the bottom of the batch. The edges of each timber piece in particular are damaged by way of this conventional method and apparatus. By way of the method and apparatus of the present invention there is provided the important improvement, in this respect, that the timber pieces are not damaged, as will be apparent from the description which follows:

Referring now to FIG. 2 which illustrates one possible advantageous embodiment of the method and apparatus of the invention, the timber batches or packages 12 are also fed one after the other to a conveyor, by way of the illustrated delivery means which includes the conveyor 10 and rotary members 11, this structure having the discharge end 13, as shown at the left of FIG. 2 and as described above in connection with FIG. 1. As each batch of timber 12 travels beyond the discharge end 13 of the delivery means, the batch travels onto an inclined ramp 24 which is preferably synchronized with the operation of the conveyor 10 so that as the conveyor 10 starts the ramp 24 rises upwardly, thus reducing the extent of inclination of the ramp 24 and assuring that the pieces of timber which travel downwardly along the ramp 24 to engage the grippers or projections 31 of the illustrated conveyor 27. This action will in itself cause, to some extent, spreading out of the timber pieces. The timber pieces operate a limit switch 26. As soon as this limit switch 26 detects the presence of timber pieces, the delivery means 10 is stopped, so that the stopping pulse derived from the limit switch 26 will terminate the operation of the conveyor 10, and simultaneously with the stopping of the conveyor 10 the ramp 24 is moved downwardly. This ramp 24 takes the form of a number of elongated bars which are hinged at their top end to a suitable support and extend downwardly from the discharge end 13 of the conveyor 10 in the manner illustrated, these elongated bars 24 thus being swingable about a horizontal axis between the dotted and solid line positions indicated in FIG. 2. The several bars which form the ramp 24 extend through spaces between several elongated members, in the form of belts or chains, which form the conveyor means 27. At their lower end region the several bars of the ramp 24 are fixed to a transverse member which is pivotally connected to a piston rod of the fluid-pressure means 25 which is automatically actuated as described above so as to bring about the change in the elevation of the ramp 24.

It is to be noted that in the event that the discharged batches of timber 12 are relatively small, or if the timber is of a type which spreads out readily, then the ramp 24 may remain in its lower position, or it may even be made stationary when used in connection with small batches or timber of a type which easily spreads out. In this event the timber will travel directly onto the upper left portion of the conveyor 27, after travelling down the stationary ramp 24 which remains in this case in the solid line position thereof shown in FIG. 2. Of course it is also possible to introduce the timber packages or batches which are to be dispersed onto the upper left part of the conveyor 27, in which case the feed conveyor 10 and ramp 24 may be omitted.

As has been indicated above the conveyor means 27 is made up of a number of endless belts or chains which are situated one behind the other as shown in FIG. 2, and these belts or chains are guided around rotary members 28–30 in the form of suitable pulleys or sprocket wheels, and a suitable drive may be provided for the rotary members 29 so as to cause the upper run of the conveyor means 27 to move toward the right, as viewed in FIG. 2, while the lower run returns toward the left to be guided around the bottom left rotary means 28 before travelling along the upper run of the conveyor means 27. This upper run of the conveyor means 27 has the lower left portion which has an inclination, if any, with respect to a horizontal plane, which is so small that along the initial path of movement provided by the lower left portion of the upper run of the conveyor means 27 this conveyor means will convey not only those timber pieces which directly engage the conveyor but also at least some of the timber pieces which are on top of those which directly engage the conveyor means 27. Thus, one of the important features of the invention resides in the fact that the ascending conveyor means 27, which has the timber-engaging projections or grippers 31, is guided around the rotary members 28–30 in such a way that this conveyor means 27 will provide for the timber pieces received from the delivery means an initial path of movement which is substantially horizontal or which is only slightly inclined in an upward direction as illustrated.

In accordance with the invention the conveyor means 27 provides subsequent to the initially substantially horizontal path of movement, a subsequent path of movement which is upwardly inclined with respect to a horizontal plane to an extent which is much greater than the initial path of movement. Thus it will be seen that the upper run of the conveyor means 27 curves smoothly and upwardly from the initial path of movement provided by the conveyor means 27, so as to provide the illustrated subsequent path of movement which is inclined upwardly, slightly to the right, as viewed in FIG. 2, at such a sharp angle that at this subsequent path of movement it is not possible for timber pieces to remain on top of those which directly engage the upper run of the conveyor means. In other words, the inclination of the subsequent path of movement for the timber pieces which is provided by the conveyor means 27 of the invention is such that the force of gravity acting on the timber pieces will be great enough to overcome the friction between the timber pieces so that any timber pieces which do not directly engage the conveyor means 27 at its upwardly inclined subsequent path of movement will subsequently travel back toward the initial path of movement provided by the conveyor means 27.

Thus, by way of the method and apparatus of the invention, subsequent to descent of the batch along the ramp 24, substantially the entire batch moves forwardly, transported by the conveyor 27 along the initial path of movement referred to above. The extent to which the projections or grippers 31 project beyond the conveyor 27 is adjusted so that the projections 31 do not extend beyond the conveyor 27 to an extent greater than the thickness of the timber pieces. As a result, those timber pieces which do not directly engage the conveyor 27 will at the upwardly curving run which forms the beginning of the subsequent path of movement referred to above start to flow or travel downwardly and backwardly toward the initial path of movement, and this flowing or travelling of those timber pieces which do not directly engage the conveyor continues until all of the timber pieces are conveyed in a single layer, at intervals determined by the projections 31, around the upper rotary means 29 onto the roller type of conveyor 20 which is identical with that of FIG. 1.

Inasmuch as those timber pieces which do not directly engage the conveyor 27 flow or travel downwardly and rearwardly from above, these timber pieces will not suffer any damage and they will not be torn or otherwise damaged by the grippers or projections 31. Subsequent to the dispersing system of the invention, after travelling down the roller track 20, the timber pieces are operated upon by the metering or dosing means 21 so that at a suitable spacing they will be received by the conveyor 22 so as to be transported for further handling as referred to above in connection with FIG. 1.

As is shown at the upper right portion of the upper run of the conveyor 27 in FIG. 2, it is possible to adjust the projections 31 so that only one timber piece will be situated in front of each projection 31 or two or more timber pieces will be situated in front of each projection 31 in engagement with each other. This is achieved simply by adjusting the projections 31 so that they will have a predetermined spacing with respect to each other. In other words some of the projections 31 can be retracted beneath the surface of the conveyor 27 which engages the timber pieces, so that only projections 31 at a given spacing from each other will project from this surface of the conveyor 27 to engage the timber pieces.

Referring now to FIG. 3, a further advantageous embodiment of the invention is illustrated therein. With the embodiment of FIG. 3 the ramp 24 of FIG. 2 has been omitted and instead has been replaced by way of a stationary slide wall 34 which extends downwardly from the discharge end 13 of the conveyor 10 so that the batch of timber 12 will simply travel by gravity downwardly along the wall 34. The timber pieces which slide down the wall 34 are received by a conveyor 32 which is smooth in a sense that it has no projections extending upwardly from its upper surface at its upper run. Thus in the embodiment of FIG. 3 the conveyor 32 forms that part of the conveyer means of the invention which provides the initial substantially horizontal path of movement, and it will be seen that in the embodiment of FIG. 3 the upper run of the conveyor 32 is indeed horizontal. This conveyor 32 is also made up of two or more endless chains or belts guided around rotary members 33 in the form of sprockets or pulleys, and also around sprockets or pulleys 28 which are laterally spaced between those sprockets or pulleys 28 which cooperate with the endless belts or chains which form the subsequent conveyer means 27' which is shown in FIG. 3 and which is similar to the conveyer means 27 of FIG. 2. Thus in FIG. 3 the conveyer 32 forms that part of the conveyer means 32, 27' which provides the initial substantially horizontal path of movement, whereas the conveyer 27' forms that part of the conveyer means 32, 27' which provides the subsequent path of movement which is upwardly inclined as illustrated, while at the same time being smoothly curved so as to have an upper concave surface in the same way as the conveyer means 27 of FIG. 2. Thus the conveyer 32 transfers the timber pieces to the conveyer 27' which continues the transportion thereof in the manner illustrated.

FIG. 3 schematically illustrates a limit switch 35. Thus this limit switch has a swingable member normally extending through a space between a pair of endless members of the conveyer 32 upwardly beyond the latter to be engaged by the timber pieces. When thus engaged by the timber pieces the switch 35 terminates the operation of the conveyer 10 while when there are no timber pieces engaging the switch 35 the feed conveyer 10 is again started as described above in connection with the limit switch 26.

In the event that the packages are relatively small, they may be introduced directly onto the conveyer 32 so that in this case the conveyer 10 may be omitted.

It is thus apparent that the embodiment of FIG. 3 also will provide the above features of the invention according to which the timber package is initially conveyed along a substantially horizontal initial path of movement and is then conveyed along an upwardly inclined path of movement which is much more steeply inclined than the initial path of movement. Of course with the embodiment of FIG. 3 the grippers or projections 31 will only be situated at the subsequent path of movement provided by way of the conveyer 27'. However it is also possible to achieve with the construction as shown in FIG. 2, for example, an arrangement according to which the grippers will project from the conveyer means 27 only at the subsequent path of movement thereof. Thus, referring to FIGS. 2A and 2B, it will be seen that the conveyer means 27 is made up of a plurality of flexible endless chains some of the links of which fixedly carry guides 31a for the projection member 31b. These guides 31a may be in the form of tubular members respectively fixed to selected links as illustrated, or they may be in the form of elongated transverse walls extending between and interconnecting corresponding links of a pair of laterally spaced chains. The guides 31a taper downwardly, as viewed in FIG. 2A, and the projection members 31b are correspondingly tapered so that they can move downwardly by gravity only to the location illustrated in FIG. 2A. At the lower run of the conveyer means 27 of FIGS. 2A and 2B, these projection members can of course fall downwardly, but they have adjacent their lower ends, as viewed in FIG. 2A, projections 31c which maintain the projecting members 31b in the guides 31a. Also beyond the projections 31c each projection 31b carries a roller 31d. With this arrangement a control means is provided to control the projection means formed by the projection members 31b so that they will extend upwardly beyond the conveyer 27 only at the subsequent path of movement thereof. Thus, as shown in FIG. 2B, situated along the path of movement of the rollers 31d only at the subsequent path of movement of the conveyer 27 is a guide rail 31e positioned so as to engage with its upper surface the rollers 31d and thus causing the projections 31b to be displaced upwardly beyond the upper surface of the conveyer 27 at the subsequent path of movement thereof, as is apparent from FIG. 2B. Thus with this arrangement the projections will remain below the upper surface of the conveyer 27 at the initial path of movement thereof while projecting above the upper surface thereof only at the subsequent path of movement thereof.

It is of course possible with the embodiments of FIGS. 2 and 3 to utilize instead of a feed conveyer 10 as a delivery means any other structure capable of delivering the batches of timber to the predetermined location where each batch will be received by that part of the conveyer means of the invention which moves away from this predetermined location while providing the initial path of movement which is substantially horizontal. Thus instead of a feed conveyer 10 it is possible to use a discharge means such as a well known tiltable lift structure.

Furthermore, the drives operatively connected to the conveyer means may be operated in such a way as to provide an irregular drive which provides for the conveyer means a jerky or vibratory movement, so that in this way it is possible to enhance the downward and backward travel or flow of those timber pieces which do not directly engage the conveyer means at the subsequent path of movement thereof.

Figure 4:
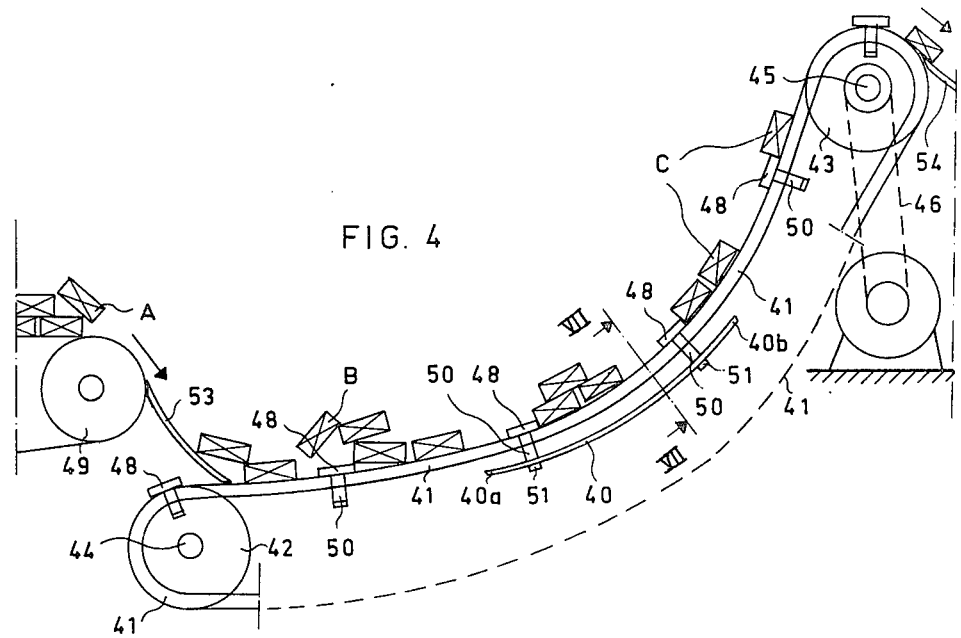
FIG. 4 is a schematic side elevation of a further embodiment of a structure and method of the invention.
Figure 5:
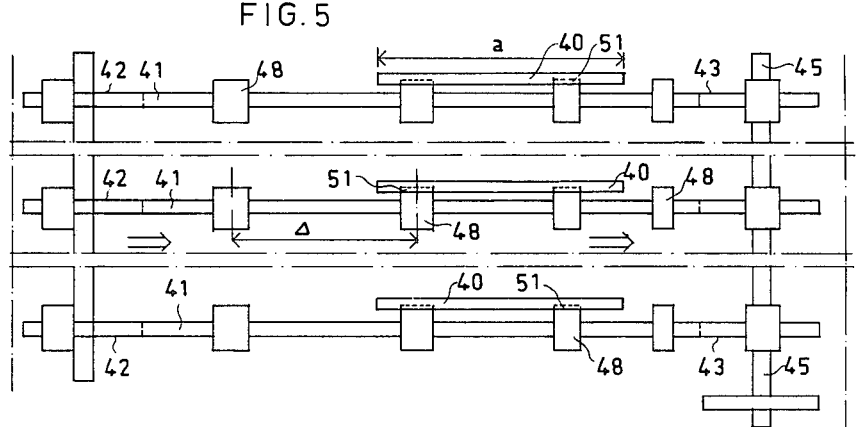
FIG. 5 shows fragmentarily in a schematic manner part of the arrangement of FIG. 4 as seen from above.
Figures 7, 7A:
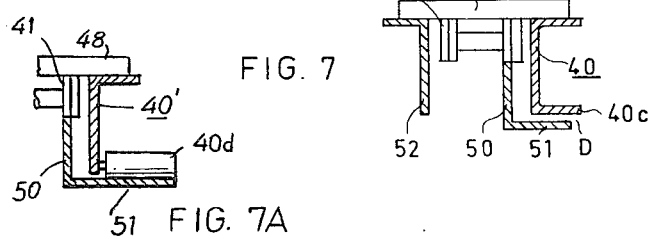
FIG. 7 is a transverse section of part of the structure of FIGS. 4 and 5 taken along line VII—VII of FIG. 4 in the direction of the arrows.
FIG. 7A is a fragmentary sectional elevation showing a further variation of the structure of FIG. 7.

Referring now to FIGS. 4, 5, and 7, it will be seen that according to this embodiment of the invention the timber packages or batches A are delivered to a conveyer means of the invention by way of a delivering means which includes a feed conveyer guided around the rotary means 49 and causing the batches A to travel down the inclined wall 53 to the predetermined location where the conveyer means of the invention provides the initial path of movement referred to above. Thus the batches of timber are delivered in suitable doses by way of the ramp or wall 53 onto the conveyer means of the invention. In the illustrated example this conveyer means includes three elongated endless flexible members 41 which may take the form of suitable chains guided by sprocket wheels 42 and 43 as illustrated. Thus the endless flexible chains 41 are all coextensive with each other while the rotary means 42 and 43 are each in the form of three sprockets around which the chains travel as illustrated in FIGS. 4 and 5. The upper run of the conveyer means 41 travels substantially horizontally to the right beyond the ramp 53, as viewed in FIG. 4, thus providing the initial path of movement which is only slightly inclined with respect to a horizontal plane. However, beyond this initial path of movement, the upper run of the chains 41 curve smoothly upwardly to a sharper extent so as to provide the subsequent path of movement at the upper right portion of the upper run of the conveyer means, as viewed in FIG. 4, this subsequent path of movement of course being inclined with respect to a horizontal plane to such a great extent that only those timber pieces which directly engage the conveyer means 41 will be transported thereby while other timber pieces on top of those which directly engage the conveyer means will travel back to the initial path of movement, as indicated above. Thus, FIG. 4 shows timber pieces C which directly engage the conveyer at its subsequent path of movement to be transported thereby, while other timber pieces on top of those timber pieces C which directly engage the conveyer means travel back to the batch B delivered to the conveyer means at its initial path of movement. It will be seen that the chains 41 carry projections 48 which engage behind at least some of the timber pieces which directly engage the conveyer means to prevent them from moving back to the initial path of movement, and additional timber pieces may be situated in front of those which directly engage the conveyer means and which are engaged by the projections 48. The timber pieces which move beyond the subsequent path of movement provided by way of the conveyer means 41 are received by a ramp 54 which causes the timber pieces to travel to a location where they are further handled. At the upper right of FIG. 4 there is shown in a schematic manner a driving motor which drives a drive chain 46 which cooperates with a sprocket on the shaft 45 to rotate the latter, this shaft 45 carrying the upper sprockets 43 around which the chains 41 travel. Thus with this embodiment of the invention also the timber batch B initially received by the conveyer means will be dispersed or spread out so as to form a mat composed of a single layer of timber pieces which may be equally spaced from each other if desired.

The conveyer means of FIGS. 4, 5, and 7 includes a guide means which guides the chains 41 at least at the subsequent path of movement thereof to achieve for the chains 41 the movement along the upwardly inclined smoothly curved subsequent path of movement referred to above. Thus this guide means will provide for the conveyer means the concave curvature at the upper run of the conveyer means where the subsequent path of movement is provided thereby. For this purpose the guide means includes elongated guide rails 40 which extend along the distance a indicated in FIG. 5. As is indicated in FIG. 4, the opposed ends 40a and 40b of each guide rail 40 are suitably rounded or curved so as to cooperate properly with additional components of the guide means, these additional components including angle members 50, 51 connected to and distributed along each chain 41 and having an outer wall 50 extending into the loop formed by each chain and situated substantially in a vertical plane as well as, at the inner end of the outer wall 50, a lateral or inner wall 51 which travels beneath and cooperates with each guide rail 40 for providing the curvature of the subsequent path of movement. The projections 48 are fixed to and distributed along each chain 41 extending laterally beyond the same, and the guide rail 40, as shown most clearly in FIG. 7, takes the form of an elongated channel member which is open at one side and which has an upper surface cooperating with the lower surfaces of the projections 48 as well as a bottom wall 40c situated at the side of the inner wall 51 of each angle member opposite from the lower run of the conveyer chain. Thus this lower wall 40c of the guide rail 40 will cooperate with the lateral inner walls 51 of the angle members to provide the required path of movement for the conveyer means.

As is apparent from FIGS. 4, 5, and 7, the guide rails 40 of the guide means of this embodiment are respectively situated beside the chains 41 at the upper runs thereof where the initial part of the subsequent path of movement is provided by the conveyer means 41. Moreover, as is apparent from FIG. 7, at the side of each chain 41 opposite from the guide rail 40 there is an additional guide means 52 which engages the lower surfaces of the projections 48 and which define with the guide rail 40 a groove which is open at the bottom. Thus with this embodiment of the invention movement of the upper run of each chain 41 at the subsequent path of movement thereof inwardly toward the loop formed by each chain 41 is prevented by upper portions of the guide rails 40 and 52, while movement of the upper run of each chain 41 outwardly away from the loop thereof in an upward direction is prevented by cooperation of the wall 51 of each angle member and the lower wall 40c of the guide rail 40. Thus the curvature of the guide rail 40 will determine the curvature of the upper run of each chain 41 during at least the initial part of the subsequent path of movement provided thereby, and as is illustrated in FIG. 4 it is possible by curving each guide rail 40 as shown in FIG. 4 to provide the concave upwardly curving subsequent path of movement illustrated in FIG. 4.

Figure 6:
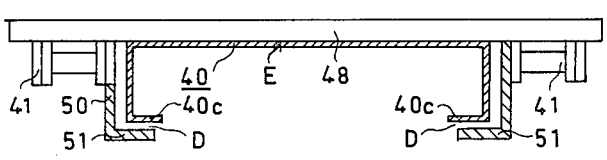
FIG. 6 is a fragmentary transverse section showing in greater detail the guiding structure of a conveyer system similar to that of FIG. 4.

With the embodiment of the invention which is shown in FIG. 6, each projection 48 is in the form of an elongated transversely extending bar which is fixed to and extends across the space between a pair of coextensive chains 41. The guide rail 40 of this embodiment is in the form of a channel which is open at the bottom and which has a relatively great width extending substantially through the entire space between the pair of chains shown in FIG. 6. The upper wall of the channel 40 of FIG. 6 has an upper surface E engaging the lower surfaces of the projections 48 to guide the chains 41 of FIG. 6. Also at its lower end the guide rail 40 has the inwardly extending flanges 40c beneath which the inner walls 51 of the angle members 50,51 extend as shown in FIG. 6. Thus this arrangement of FIG. 6 also is capable of providing the guiding of the invention which will achieve the concave curvature for the chains as referred to above. Thus it will be seen that with the above embodiment of FIG. 6 the angle member 50,51 are fixed to those sides of the chains 41 which are nearest to each other. FIGS. 6 and 7 show the location D where the inner walls 51 of the angle members respectively have sliding contact with the flanges 40c of the guide rails 40.

Figure 8:
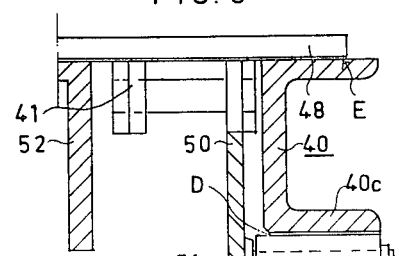
FIG. 8 is a fragmentary sectional view on an enlarged scale showing a variation of the structure of FIG. 7.

The construction as shown in FIG. 8 is substantially the same as that of FIG. 7, the difference being that the inner wall of the angle members 50,51 takes the form of a series of rollers 51a which have a rolling contact with the flange 40c of the guide rail 40. Of course in this case also the chain 41 travels through a groove defined between the guide rails 40 and 52. As is apparent from FIG. 5, the projections 48 as well as the angle members 50,51 are spaced from each other along each chain by the distance Δ. It is to be noted that with the embodiment of FIG. 8 the inner wall of each angle member may take the form of a single roller 51a or a plurality of rollers situated one after the other.

Of course, as is indicated in FIG. 7A, it is possible to reverse the arrangement shown in FIG. 8 by providing the guide rail 40' with a series of rollers 40d distributed therealong and replacing the flange 40c, these rollers 40d engaging the inner wall 51 of the angle members 50,51 in the manner apparent from FIG. 7A. It is to be understood that the guide rails referred to above and the angle members which cooperate therewith need not always have a sliding or rolling contact with respect to each other, inasmuch as with the method and apparatus of the invention a safety action is achieved in such a way that the endless members of the conveyer means are maintained along the concave path of travel in tracks provided by the grooves defined between each pair of cooperating members 40 and 52 even during unusual operating conditions.

Figure 9:
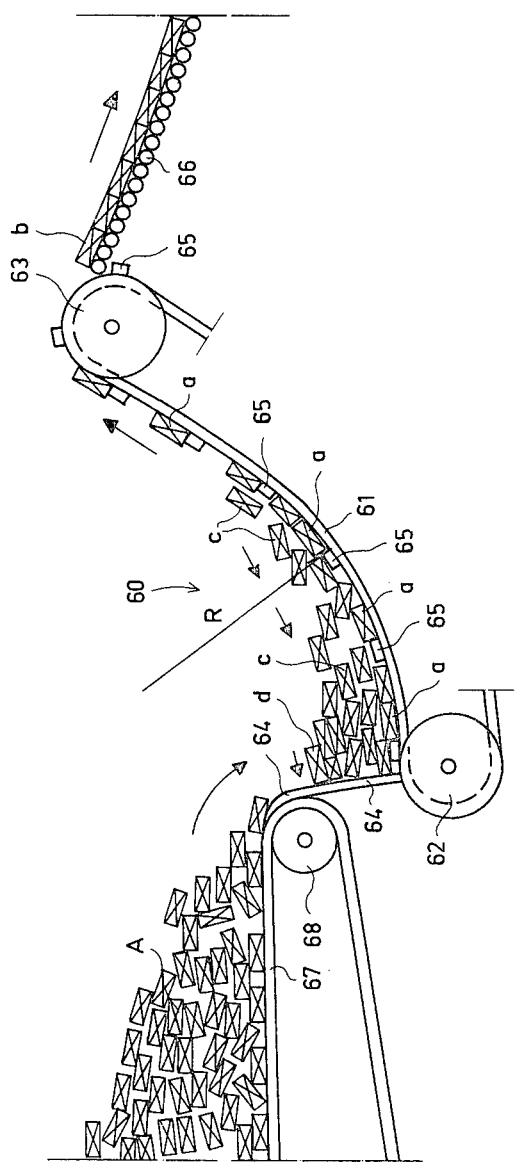
FIG. 9 is a fragmentary schematic side elevation illustrating yet another embodiment of a structure and method of the invention.

Referring now to FIG. 9, the embodiment of the invention illustrated therein includes a conveying means made up of one or more endless flexible members 61 in the form of suitable belts or chains, these endless members 61 being guided around suitable rotary means 62 and 63 in the form of suitable sprockets or pulleys, with the upper rotary members 63 being driven to provide for operation of the conveyor means. The endless flexible members 61 of the conveyor means carry projections 65 for engaging behind timber pieces a and these projections 65 preferably have rounded edges. The upper run of each endless member 61 of the conveyor means of FIG. 9 is guided, for example by way of the guide means referred to above in connection with FIGS. 4–8, so as to have the initial substantially horizontal path of movement and the subsequent upwardly inclined path of movement. Thus it will be seen that the upper runs of the members 61 curve smoothly from the initial path of movement upwardly along subsequent path of movement.

As shown in FIG. 9, the timber batches A which are to be dispersed are delivered by way of a delivering means which includes the conveyor 67 guided around rotary members 68, so that as each batch A travels beyond the conveyor 67 it falls down onto the conveyor means 61 at a predetermined location where the conveyor means 61 provides the initial path of movement which is horizontal or inclined upwardly only to a slight extent. From the region 60 where the initial and subsequent paths of movement join each other the timber pieces are conveyed upwardly beyond the conveyor means 61 to be delivered in the form of a mat b of timber pieces forming a single layer on the roller type of incline conveying plane 66 shown in FIG. 9.

According to a particular feature of the invention, a back-up wall 64 is situated at the discharge end of the delivering means 67,68, extending downwardly from the discharge end to that part of the initial path of movement provided by way of the conveyor means 61 which is most distant from the subsequent path of movement thereof. Thus it will be seen that the back-up wall 64 extends upwardly from the members 61 where they travel around the rotary member 62, being substantially perpendicular to these members 61 at this particular location. Thus the back-up wall 64 is substantially vertical. Of course this wall 64 may take the form of a plurality of bars which are parallel to and spaced from each other while extending vertically. Thus, the back-up wall 64 and the initial part of the conveyor means are substantially perpendicular to each other, whereas distant from the back-up wall 64 the conveyor means curves upwardly at a fairly sharp angle while extending smoothly from the initial path of movement so as to achieve the subsequent path of movement referred to above, the conveyor means 61 having the radius of curvature R which is shown in FIG. 9 and which is relatively great. The inclination of the subsequent path of movement of the conveyor means, as shown at the upper right portion of the members 61 in FIG. 9, may be on the order of, for example, between 50° and 60°. Of course it is also possible to assemble two or more conveyors one after the other, in the manner shown, for example, for the conveyors 32 and 27' of FIG. 3, in order to achieve the results of the invention.

With the arrangement of FIG. 9 the timber batch A is delivered by the delivering means 67,68 onto the initial part of the conveyor means 61, and this initial part of the conveyor means 61 provides the initial path of movement where substantially the entire batch is transported to the right away from the back-up wall 64. Thus the entire batch moves away from the wall 64 and ascends substantially in the form of a single heap, although naturally in such a way that a minor dispersion of the timber pieces takes place at the trailing end of the heap which forms against the back-up wall 64. When this heap has travelled upwardly along the subsequent path of movement to such an extent that gravity overcomes the force of friction between the timber pieces, then those timber pieces which do not directly engage the conveyor means begin to slide and flow or travel downwardly and rearwardly, mainly on their flat wider sides, back toward the initial path of movement, so that at least those timber pieces at the rear part of the initially raised timber heap d encounter the back-up wall 64.

This back-up wall 64 forms a reorienting means. Thus during the backward travel of those timber pieces which do not directly engage the conveyor means, at least some of the latter timber pieces may not be at an orientation which is transverse to the path of travel provided by the conveyor means 61. Those timber pieces which thus have an oblique orientation with respect to the path of travel, instead of being transverse thereto, come into an engagement with the back-up wall which serves to reorient these pieces so that they again extend in a direction which is transverse to the path of movement provided by way the conveyor means. Thus by the action of the substantially vertical back-up wall 64, such timber pieces as have assumed an oblique orientation are again reoriented so as to extend tranversely of the conveyor means, and thus the timber pieces which are undergoing dispersal maintain a better organization and the dispersal thereof takes place without any violent pulling and without any problems. To the extent that the projections 65 transport the timber pieces a to form a mat b, the timber pieces c slide by gravity backwardly toward the initial path of movement primarily on the wider flat sides of the timber pieces, this backward travel taking place in good order downwardly and rearwardly. The greater the width or breadth dimension of the timber pieces the less tendency there is for the timber pieces to roll, which is well known to give rise to damage of the edges, particularly if the timber pieces are dispersed by a forcible, positive pulling action.

Experience has shown that the back-up wall 64 produces a remarkably favorable influence on the dispersal of the heaps of timber pieces. A partial explanation for this advantage resides in the fact that the rectifying effect of the backup wall 64 is based on the fact that the timber pieces which slide downwardly and rearwardly back toward the initial path of movement do not strike forcibly against the back-up wall 64 with any high velocity because prior to contact with the back-up wall the substantially horizontal run of the conveyor means gives the backwardly travelling pieces an opportunity to slow down and reduce the speed with which they travel back toward the reorienting means formed by the wall 64.

With the embodiment of FIG. 9, if the timber batches A are periodically delivered by the delivery means 67,68 to the conveyor means 61, just in front of the back-up wall 64, the operation of the conveyor means has a short-range periodicity in that at first the timber batch as a whole begins to ascend on the ascending part of the conveyor means. Then at a certain stage the uppermost timber pieces begin to slide on their wider flat sides back down, and such downward and backward sliding up against the back-up wall 64 continues for a certain time. Then the reduced timber batch once again begins to ascend as a whole until the moment when it begins once more to disperse downwardly and backwardly. In this manner the operation continues with relatively short cycles until the entire batch has been dispersed, or until a new timber batch or new timber pieces are delivered by way of the conveyor 67,68 onto the initial part of the upper run of the conveyor means where the latter provides the initial path of movement referred to above.

Thus, one of the important features of the embodiment of the invention illustrated in FIG. 9 is the rectifying effect of the back-up wall 64 on the timber pieces which travel back and engage this back-up wall. This engagement of the wall 64 with the timber pieces which flow against it promotes the organization of the batch which is being dispersed and reduces the extent of trouble which might otherwise be encountered as well as the amount of energy which is required for dispersal. Obviously, not all of the timber pieces will strike against the back-up wall 64. The achievement of the effect of the invention is partly based on the fact that the ascending conveyor means curves upwardly rather smoothly and with the large radius of curvature R. There is also the advantage of the invention that many pieces can be dispersed from a relatively large batch.

Of course, the invention is not confined to the details presented above, inasmuch as these details many vary within the scope of the inventive concept defined by the claims which follow below. Also it will be understood that the structure includes certain features which have not been illustrated or described. For example, the lower part of the upper run of each of the conveyor means of the invention, where the conveyor means provides the initial path of movement, will be situated between a pair of unillustrated upright walls which define with the conveyor means as well as with any of the above ramps or with the back-up wall 64 of FIG. 9 a space for receiving each batch of timber from the delivering means, the timber of course being conveyed upwardly from the space between such a pair of upright walls by way of the conveyor means of the invention. Also, the shafts for the rotary members which guide the chains or belts, and members which carry structure such as the guide rails 40 and 52 will be supported by the side-frame members which are not illustrated.

What is claimed is:

1. In an apparatus for conveying timber in a manner which will disperse a batch of timber pieces into individual timber pieces which are conveyed one after the other, delivering means for delivering a batch of timber to a predetermined location, conveyor means situated in part at said predetermined location for receiving a timber batch delivered by said delivering means to said predetermined location, said conveyor means including for timber conveyed thereby an initial path of movement which has an inclination, if any, with respect to a horizontal plane which is small enough to convey with said conveyor means the timber batch from the predetermined location with a substantial number of timber pieces disposed in overlying relationship with and frictionally engaging those timber pieces which directly engage the conveyor means, and said conveyor means including for timber conveyed thereby after said initial path of movement a subsequent path of movement which is curved smoothly upwardly so that the conveyor means conveys at least the pieces directly engaging said conveyor means upwardly along said subsequent path of movement, said subsequent path of movement having an inclination great enough such that the component of gravitational force acting on overlying timber pieces is sufficient in magnitude and direction so as to overcome the frictional forces which exist between the overlying timber pieces and the timber pieces directly engaging the conveyor means so that the overlying timber pieces will slide downwardly in a direction opposite to the direction of movement of the conveyor means and arrive at the initial path of movement of the conveyor means, so that by the time said conveyor means has conveyed timber pieces to the region of an end of said subsequent path of movement said conveyor means conveys substantially only timber pieces which directly engage said conveyor means one after the other and wherein said conveyor means includes at least a pair of coextensive endless flexible members each in the form of an endless chain, belt, or the like, said endless flexible members being laterally spaced from each other and having upper runs extending along said initial and subsequent paths of movement and lower runs situated beneath said upper run, said conveyor means including rotary means respectively having axes of rotation transverse to said paths of movement and respectively situated at ends of said initial and subsequent path of movement which are distant from each other, said endless means extending around said rotary means and forming a loop having opposed ends where said rotary means are respectively located, and said conveyor means further including a guide means extending along at least a part of the upper run of said endless means which travels along from said subsequent path of movement and situated in said loop for guiding said conveyor means for movement along said subsequent path of movement at said upper run of said conveyor means said guide means including a plurality of angle members which are carried by and distributed along each of said endless members and extending therefrom at least partly into said loop, said angle members each having an outer wall connected directly to said endless members and extending therefrom inwardly to said loop in a substantially vertical plane and an inner wall extending laterally from said outer wall at an end thereof a distance from said endless members, and said guide means including at least one guide rail having a configuration corresponding to at least part of said subsequent path of movement and situated at the side of said inner walls of said angle members opposite from said lower run for cooperating with said inner walls of said angle members to guide said upper run of said conveyor means for movement along said subsequent path of movement, said endless members respectively having at said upper run of said conveyor means upper surfaces for engaging timber pieces and carrying at said upper surfaces a projection means which projects at least to a slight extent upwardly from said upper surfaces at said upper run of said conveyor means for engaging behind at least some of the timber pieces to prevent the latter from moving downwardly along said upper run of said conveyor means at said subsequent path of movement thereof, said projection means extending laterally beyond said endless members and having at said upper run of said endless conveyor means a lower surface directed toward said inner walls of said angle members, and said guide rail having a surface engaging said lower surface of said projection means for contributing to the guiding of said endless members.

2. The combination of claim 1 and wherein said projection means includes a plurality of transverse elongated projection members fixed to said pair of endless members and extending across and between the same, and said guide rail having a channel-shaped configuration also extending across the space between said endless members with said guide rail having an upper wall engaging the lower surfaces of said projection members, said channel being open at the bottom thereof.

3. The combination of claim 1 and where each of said endless members carries a plurality of projection members forming said projection means and each extending laterally beyond each endless member, and said guide means including a plurality of guide rails respectively situated beside said endless members for engaging said inner walls of said angle members as well as surfaces of said projection members which are directed towards an inner wall.

4. In a apparatus for conveying timber in a manner which will disperse a batch of timber pieces into individual timber pieces which are conveyed one after the other, delivering means for delivering a batch of timber to a predetermined location, conveyor means situated in part at said predetermined location for receiving a timber batch delivered by said delivering means to said predetermined location, said conveyor means including for timber conveyed thereby an initial path of movement which has an inclination, if any, with respect to a horizontal plane which is small enough to convey with said conveyor means the timber batch from the predetermined location with a substantial number of timber pieces disposed in overlying relationship with and frictionally engaging those timber pieces which directly engage the conveyor means, and said conveyor means including for timber conveyed thereby after said initial path of movement a subsequent path of movement which is curved smoothly upwardly so that the conveyor means conveys at least the pieces directly engaging said conveyor means upwardly along said subsequent path of movement, said subsequent path of movement having an inclination great enough such that the component of gravitational force acting on overlying timber pieces is sufficient in magnitude and direction so as to overcome the frictional forces which exist between the overlying timber pieces and the timber pieces directly engaging the conveyor means so that the overlying timber pieces will slide downwardly in a direction opposite to the direction of movement of the conveyor means and arrive at the initial path of movement of the conveyor means, so that by the time said conveyor means has conveyed timber pieces to the region of an end of said subsequent path of movement said conveyor means conveys substantially only timber pieces which directly engage said conveyor means one after the other and wherein said delivering means includes an inclined ramp inclined downwardly to said conveyor means at an initial part of said initial path of movement thereof, feed means for feeding a batch of timber to said ramp to travel downwardly along the same to said initial part of said initial path of movement of said conveyor means, and projections forming part of said conveyor means and extending upwardly from an upper surface thereof for becoming situated behind the timber pieces which directly engage said conveyor means to prevent rearward movement of timber pieces with respect to said conveyor means and wherein means are operatively connected with said ramp for moving the latter up and down in synchronism with delivery of batches of timber by said feed means to said ramp with the synchronization of movement of said ramp being such that the latter rises upwardly when said feed means deposits a batch of timber on said ramp, for providing by way of said ramp a smooth flow of timber down to said conveyor means at said initial path of movement thereof.

5. In a apparatus for conveying timber in a manner which will disperse a batch of timber pieces into individual timber pieces which are conveyed one after the other, delivering means for delivering a batch of timber to a predetermined location, conveyor means situated in part at said predetermined location for receiving a timber batch delivered by said delivering means to said predetermined location, said conveyor means including for timber conveyed thereby an initial path of movement which has an inclination, if any, with respect to a horizontal plane which is small enough to convey with said conveyor means the timber batch from the predetermined location with a substantial number of timber pieces disposed in overlying relationship with and frictionally engaging those timber pieces which directly engage the conveyor means, and said conveyor means including for timber conveyed thereby after said initial path of movement a subsequent path of movement which is curved smoothly upwardly so that the conveyor means conveys at least the pieces directly engaging said conveyor means upwardly along said subsequent path of movement, said subsequent path of movement having an inclination great enough such that the component of gravitational force acting an overlying timber pieces is sufficient in magnitude and direction so as to overcome the frictional forces which exist between the overlying timber pieces and the timber pieces directly engaging the conveyor means so that the overlying timber pieces will slide downwardly in a direction opposite to the direction of movement of the conveyor means and arrive at the initial path of movement of the conveyor means, so that by the time said conveyor means has conveyed timber pieces to the region of an end of said subsequent path of movement said conveyor means conveys substantially only timber pieces which directly engage said conveyor means one after the other and wherein said conveyor means includes projections for projecting from an upper surface of said conveyor means to engage behind timber pieces for preventing the latter from moving backwardly along said conveyor means particularly at said subsequent path of movement thereof, said conveyor means including projection guides for guiding said projections for movement upwardly from an upper surface of said conveyor means and downwardly below said upper surface, and control means cooperating with said projections for displacing the latter upwardly beyond said upper surface of said conveyor means only at said subsequent path of movement with said projections remaining below the upper surface of said conveyor means at said initial path of movement.

6. In a apparatus for conveying timber in a manner which will disperse a batch of timber pieces into individual timber pieces which are conveyed one after the other, delivering means for delivering a batch of timber to a predetermined location, conveyor means situated in part at said predetermined location for receiving a timber batch delivered by said delivering means to said predetermined location, said conveyor means including for timber conveyed thereby an initial path of movement which has an inclination, if any, with respect to a horizontal plane which is small enough to convey with said conveyor means the timber batch from the predetermined location with a substantial number of timber pieces disposed in overlying relationship with and frictionally engaging those timber pieces which directly engage the conveyor means, and said conveyor means including for timber conveyed thereby after said initial path of movement a subsequent path of movement which is curved smoothly upwardly so that the conveyor means conveys at least the pieces directly engaging said conveyor means upwardly along said subsequent path of movement, said subsequent path of movement having an inclination great enough such that the component of gravitational force acting on overlying timber pieces is sufficient in magnitude and direction so as to overcome the frictional forces which exist between the overlying timber pieces and the timber pieces directly engaging the conveyor means so that the overlying timber pieces will slide downwardly in a direction opposite to the direction of movement of the conveyor means and arrive at the initial path of movement of the conveyor means, so that by the time said conveyor means has conveyed timber pieces to the regions of an end of said subsequent path of movement said conveyor means conveys substantially only timber pieces which directly engage said conveyor means one after the other and wherein said conveyor means includes a first endless conveyor having a substantially horizontal upper run defining said initial path of movement and a subsequent endless conveyor having a smoothly inclined upper run defining said subsequent path of movement, and further including projection means extending upwardly from the upper run of said subsequent endless conveyor.

* * * * *